United States Patent
Budd et al.

(10) Patent No.: US 6,245,700 B1
(45) Date of Patent: Jun. 12, 2001

(54) TRANSPARENT MICROSPHERES

(75) Inventors: Kenton D. Budd, Woodbury, MN (US); Toshihiro Kasai, Sagamihara (JP); Stephen B. Roscoe, St. Paul, MN (US); Chikafumi Yokoyama, Kawasaki (JP); John E. Bailey, Milwaukee, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/362,323

(22) Filed: Jul. 27, 1999

(51) Int. Cl.$^7$ ................................................. C03C 12/02
(52) U.S. Cl. ............................ 501/34; 501/3; 501/33; 501/10
(58) Field of Search ............................ 501/34, 10, 33, 501/3; 404/12, 14

(56) References Cited

U.S. PATENT DOCUMENTS

| | | | |
|---|---|---|---|
| 2,354,018 | 7/1944 | Heltzer et al. | 88/82 |
| 2,924,533 | 2/1960 | McMullen | 106/57 |
| 2,960,594 | 11/1960 | Thorpe | 219/75 |
| 2,963,378 | 12/1960 | Palmquist et al. | 106/193 |
| 3,145,114 | 8/1964 | Rindone | 106/47 |
| 3,149,016 | 9/1964 | Tung et al. | 161/1 |
| 3,228,897 | 1/1966 | Nellessen | 260/16 |
| 3,294,558 | 12/1966 | Searight et al. | |
| 3,410,185 | 11/1968 | Harrington | 94/22 |
| 3,416,936 | 12/1968 | Sproul, Jr. | 106/52 |
| 3,432,314 | 3/1969 | Mazdiyasni et al. | 106/57 |
| 3,493,403 | 2/1970 | Tung et al. | 106/47 |
| 3,560,074 | 2/1971 | Searight et al. | 350/105 |
| 3,709,706 | 1/1973 | Sowman | 106/57 |
| 3,795,524 | 3/1974 | Sowman | 106/65 |
| 3,864,113 | 2/1975 | Dumbaugh, Jr. et al. | 65/60 |
| 3,915,771 | 10/1975 | Gatzke et al. | 156/71 |
| 4,056,602 | 11/1977 | Matovich | 423/345 |
| 4,095,974 | 6/1978 | Matovich | 75/0.5 B |
| 4,106,947 | 8/1978 | Recasens et al. | 106/57 |
| 4,137,086 | 1/1979 | Potter et al. | 106/52 |
| 4,248,932 | 2/1981 | Tung et al. | 428/325 |
| 4,367,919 | 1/1983 | Tung et al. | |
| 4,564,556 | 1/1986 | Lange | 428/325 |
| 4,607,697 | 8/1986 | Urffer | 166/280 |
| 4,621,936 | 11/1986 | Hansson et al. | 401/215 |
| 4,758,469 | 7/1988 | Lange | 428/325 |
| 4,772,511 | 9/1988 | Wood et al. | 428/325 |
| 4,837,069 | 6/1989 | Bescup et al. | 428/148 |
| 4,931,414 | 6/1990 | Wood et al. | 501/103 |
| 5,227,221 | 7/1993 | Hedblom | 428/172 |
| 5,268,789 | 12/1993 | Bradshaw | 359/534 |
| 5,286,682 | 2/1994 | Jacobs et al. | 501/34 |
| 5,310,278 | 5/1994 | Kaczmarczik et al. | 404/14 |
| 5,502,012 | 3/1996 | Bert et al. | 501/103 |
| 5,576,097 | 11/1996 | Wyckoff | 428/325 |
| 5,670,209 | 9/1997 | Wyckoff | 427/215 |
| 5,716,706 | 2/1998 | Morris | 428/402 |
| 5,853,851 | * 12/1998 | Morris | 428/149 |

FOREIGN PATENT DOCUMENTS

| | | |
|---|---|---|
| 209431 | * 5/1984 | (DE) . |
| 1404190 | 11/1965 | (FR) . |
| 51-55428 | 5/1976 | (JP) . |
| 53-22513 | 3/1978 | (JP) . |
| 53-88815 | 8/1978 | (JP) . |
| 53-102325 | 9/1978 | (JP) . |
| 55-20254 | 2/1980 | (JP) . |
| 55-20256 | 2/1980 | (JP) . |
| 55-126547 | 9/1980 | (JP) . |
| 55-126548 | 9/1980 | (JP) . |
| 56-41852 | 4/1981 | (JP) . |
| 60-215549 | 10/1985 | (JP) . |
| 61-68349 | 4/1986 | (JP) . |
| 61-270235 | 11/1986 | (JP) . |
| 5-85771 | 4/1993 | (JP) . |
| WO 96/33139 | 10/1996 | (WO) . |
| WO 98/47830 | 10/1998 | (WO) . |

OTHER PUBLICATIONS

Ceram. Engr. Sci. Proc., 16, 1015–25 (1995) No Month.
Ceram. Eng. Sci. Proc. 16(2) 84–95 (1995) No Month.
Materials Science Research (1984), 17, 213 No Month.
Journal De Physiquie, Coloque C1, supplement au n 2, Tome 47, fevrier 1986, p. C1–473 No month.

* cited by examiner

*Primary Examiner*—Karl Group
(74) *Attorney, Agent, or Firm*—Carolyn A. Fischer

(57) ABSTRACT

Transparent solid microspheres that contain titania plus alumina, zirconia, and/or silica in a total content of at least about 75% by weight, based on the total weight of the solid microspheres, wherein the total content of alumina, zirconia, and titania is greater than the content of silica.

33 Claims, No Drawings

TRANSPARENT MICROSPHERES

TECHNICAL FIELD

The present invention relates to transparent microspheres (i.e., beads) that preferably include titania plus alumina, zirconia, and/or silica. More particularly, the present invention relates to fused microspheres having both transparency and mechanical properties suitable, for example, for lens elements in retroreflective articles.

BACKGROUND

Transparent glass microspheres (i.e., beads) used in reflectors such as reflective sheets and road surface reflectors can be produced by, for example, melting methods. Such melting methods typically include melting a raw material composition in the form of particulate material. The liquid can then be quenched in water, dried, and crushed to form particles of a size desired for the final beads. The crushed particles are then passed through a flame having a temperature sufficient to melt and spheroidize the crushed particles. For most glasses this is a temperature of about 1000° C. to about 1450° C. Alternatively, the liquid can be poured into a jet of high velocity air. Beads are formed directly in the resulting stream. The velocity of the air is adjusted to control the size of the beads. These beads are normally composed of a vitreous material that is completely amorphous (i.e., noncrystalline), and hence, the beads are often referred to as "vitreous," "amorphous," or simply "glass" beads or microspheres.

Silica is a common component of glass-forming compositions. Alumina and zirconia have also been used in transparent glass beads to improve mechanical properties such as toughness, hardness, and strength. However, the amount of alumina and zirconia such beads can contain tends to be limited so as to avoid problems arising from crystallization, such as loss of transparency and processing difficulties. The most highly durable compositions comprise primarily alumina, zirconia, and silica with small amounts of modifiers (e.g., alkaline earth oxides). These compositions tend to have very high melting points and require special processing equipment such as a hydrogen flame or plasma torch. Lower melting compositions with high modifier content typically have poorer mechanical properties and provide only modest improvements over conventional glass beads. In addition, compositions with high modifier content (e.g., greater than about 25% by weight) can exhibit poor chemical durability. High durability fused beads described to date generally do not have a desirable refractive index unless the zirconia content is high (e.g., greater than about 55% by weight); however, high zirconia content tends to raise the melting point and the tendency to crystallize, creating difficulty in obtaining transparent microspheres without the use of a plasma gun or other specialized equipment.

Conventional barium titanate-based glass bead compositions are typically based on the compound $BaTiO_3$, or the $BaO/TiO_2$ eutectic, and can contain silica or a higher index oxide such as tin oxide or zinc oxide. They can contain greater than about 55% titania, although lower titania compositions comprising primarily lead oxide are also known. Barium titanate-based glass bead compositions are typically low durability glass beads, contain greater than 20% alkaline earth oxides, have not been or are not readily transformed to transparent beads with significant microcrystallinity, and generally contain little or no alumina and zirconia.

SUMMARY

What is needed are transparent solid beads (i.e., microspheres) having good mechanical properties characteristic of zirconia/alumina/silica (ZAS) compositions having a low modifier content (e.g., no greater than about 25% by weight of an alkaline earth oxide), higher refractive indices, lower melting temperatures, and improved quenching behavior.

In one embodiment of the present invention, the microspheres include titania plus alumina, zirconia, and/or silica in a total content of at least about 75% by weight, based on the total weight of the solid microspheres. The statement that the compositions include "titania plus alumina, zirconia, and/or silica" means that the compositions include titania and at least one of alumina, zirconia, and silica. Preferably, the total content of titania, alumina, and zirconia (which may not all be present in any one composition) is greater than the content of silica (if it is present). In a particularly preferred embodiment, the titania content is at least about 10% by weight, and more preferably, no greater than about 50% by weight, based on the total weight of the solid microspheres.

Preferably, the microspheres are glass ceramic microspheres, which preferably have a nanoscale glass ceramic microstructure. For certain preferred embodiments, the microspheres include a crystalline phase that includes a titanate compound (e.g., calcium titanate), titanium oxide, a zirconate compound, zirconium oxide, or combinations thereof.

Yet another preferred embodiment of the present invention includes fused microspheres. As used herein, "fused" microspheres refer to those that are prepared by a melt process, as opposed to a sol-gel process. Such fused microspheres may be completely amorphous (i.e., noncrystalline) or they may have crystalline and noncrystalline regions.

Preferably, the microspheres have an index of refraction of at least about 1.7 and are useful as lens elements in retroreflective articles. In one embodiment, glass ceramic microspheres have an index of at least about 2.0 and are particularly useful for wet retroreflective articles.

The present invention also provides a retroreflective article comprising transparent solid microspheres described above. One preferred article is a pavement marking tape comprising a backing and transparent solid microspheres coated thereon. The present invention also provides a pavement marking comprising transparent solid microspheres described above.

DETAILED DESCRIPTION OF THE PREFERRED EMBODIMENTS

The present invention provides transparent, solid microspheres (i.e., beads) of various compositions containing titania and at least one of alumina, zirconia, and silica. It is preferable that the microspheres exhibit a relatively low liquidus temperature (preferably, no greater than about 1400° C., and more preferably, no greater than about 1300° C.), and form a clear, transparent glass when quenched. Also, preferred microspheres form a microcrystalline glass-ceramic structure via heat treatment yet remain transparent.

Upon initial formation from a melt, typically the beads are substantially amorphous (but can contain some crystallinity); however, upon further heat treatment, the beads can develop crystallinity in the form of a nanoscale glass ceramic microstructure (i.e., microstructure in which a significant volume fraction of crystals less than about 100 nanometers in diameter has grown from within an initially amorphous structure). Surprisingly, even with this crystal formation, the compositions remain transparent. Preferably, the size of the crystals in the crystalline phase is less than about 20 nanometers (0.02 micron) in diameter. Crystals of this size are not typically effective light scatterers, and therefore, do not decrease the transparency significantly.

Typically, fused beads (i.e., those made from a melt process) comprise a dense, atomistically homogeneous glass network from which nanocrystals can nucleate and grow during subsequent heat treatment. Sol-gel beads typically comprise a mixture of amorphous material, such as sintered colloidal silica, and nanocrystalline components, such as zirconia, which crystallize during chemical precursor decomposition or sintering. The remaining amorphous matrix of sol-gel beads tends to be less resistant to further crystallization and opacification than that of fused beads. This is particularly true for alkaline earth containing compositions.

The terms "beads" and "microspheres" are used interchangeably and refer to particles that are substantially, although perhaps not exactly, spherical. The term "solid" refers to beads that are not hollow, i.e., they lack substantial cavities or voids. To be optionally useful as lens elements, the beads should be spherical and solid. Solid beads are typically more durable than hollow beads, particularly when exposed to freeze-thaw cycles.

The term "transparent" means that the beads when viewed under an optical microscope (e.g., at 100×) have the property of transmitting rays of visible light so that bodies beneath the beads, such as bodies of the same nature as the beads, can be clearly seen through the beads when both are immersed in oil of approximately the same refractive index as the beads. Although the oil should have a refractive index approximating that of the beads, it should not be so close that the beads seem to disappear (as they would in the case of a perfect index match). The outline, periphery, or edges of bodies beneath the beads are clearly discernible.

Transparent solid beads according to the present invention preferably have an index of refraction of at least about 1.7, more preferably, at least about 1.8, and most preferably, at least about 1.85. Preferably, for use in air, the beads have an index of refraction of no greater than about 2.0, and more preferably, no greater than about 1.95. Preferably, for use in water or a wet environment, the beads have a higher index of refraction, which is typically greater than about 2.0 and often as high as 2.2. Such beads are useful as lens elements in retroreflective articles.

Beads of the invention can be made and used in various sizes, although about 50 microns ($\mu$m) to about 500 $\mu$m is typically desired. It is difficult to deliberately form beads smaller than 10 $\mu$m in diameter, though a fraction of beads down to 2 $\mu$m or 3 $\mu$m in diameter is sometimes formed as a by-product of manufacturing larger beads. Generally, the uses for beads call for them to be less than about 2 millimeters in diameter, and most often less than about 1 millimeter in diameter.

Transparent beads according to the present invention exhibit generally high hardness levels, generally high crush strengths, and high durability. For example, the Vickers hardness of the transparent beads is preferably at least about 800 kg/mm$^2$, more preferably at least about 900 kg/mm$^2$, most preferably at least about 1,000 kg/mm$^2$, and optimally at least about 1300 kg/mm$^2$. Although there is no particular limit on the upper limit of hardness, the hardness is typically no greater than about 2,000 kg/mm$^2$.

The crush strength values of the beads of the invention can be determined according to the test procedure described in U.S. Pat. No. 4,772,511 (Wood). Using this procedure, the beads demonstrate a crush strength of preferably at least about 690 MPa, more preferably at least about 960 MPa, and most preferably at least about 1240 MPa.

The durability of the beads of the invention can be demonstrated by exposing them to a compressed air driven stream of sand according to the test procedure described in U.S. Pat. No. 4,758,469 (Lange). Using this procedure, the beads are highly resistant to fracture, chipping, and abrasion, as evidenced by retention of about 50% to about 80% of their original reflected brightness.

Microsphere Compositions

As is common in the glass and ceramic art, the components of the beads are described as oxides, which is the form in which they are presumed to exist in the completed articles, and which correctly account for the chemical elements and their proportions in the beads. The starting materials used to make the beads may be some chemical compound other than an oxide, such as a carbonate, but the composition becomes modified to the oxide form during melting of the ingredients. Thus, the compositions of the beads of the present invention are discussed in terms of a theoretical oxide basis.

The formulations described herein are reported on a theoretical oxide basis based on the amounts of starting materials used. These values do not necessarily account for fugitive materials (e.g., fugitive intermediates) that are volatilized during the melting and spheroidizing process. Typically, for example, boria ($B_2O_3$), alkali metal oxides, and zinc oxide, are somewhat fugitive. Thus, if a finished product were analyzed there could be as much as a 5% loss of the original amount of boria and/or alkali metal oxide added to make the final microspheres. However, herein, as is conventional, all components of the final microspheres are calculated based on the amounts of starting materials and the total weight of the glass forming composition, and are reported in weight percents of oxides based on a theoretical basis.

Generally, transparent beads (preferably, fused beads) according to the present invention include titania plus alumina, zirconia, and/or silica. In addition, the transparent beads can include an alkaline earth metal oxide, such as baria, strontia, magnesia, or calcia. Moreover, the beads can include oxides of elements such as lithium, sodium, potassium, yttrium, tin, boron, and the like, either alone or in combination, provided they do not detrimentally impact the desired properties of the beads. In certain preferred embodiments, no greater than about 25% by weight of these oxides is incorporated into the beads of the invention. More preferred embodiments contain less than 20% by weight alkaline earth oxides. Most preferred embodiments contain less than 15% by weight baria and/or strontia and optimally less than 10%. It is also preferred that alkali metal oxides be included in the beads in no more than about 10% by weight.

In the compositions in which the total content of more than one component is discussed, the beads can include only one of the components listed, various combinations of the components listed, or all of the components listed. For example, if a bead composition is said to include a total content of alumina and zirconia in an amount of 40% by weight, it can include 40% by weight alumina, 40% by weight zirconia, or 40% by weight of alumina plus zirconia.

In a preferred embodiment, transparent beads according to the present invention include titania plus zirconia, alumina, and/or silica in a total amount of at least about 75% by weight, based on the total weight of the beads. Preferably, the total content of these components is at least about 80% by weight.

Generally, zirconia and alumina are known to provide high hardness and strength to ceramic articles. Silica is useful as a glass former, and provides some reduction in liquidus temperature when combined with alumina and zirconia. However, silica has a low refractive index and even the useful low melting region in the zirconia/alumina/silica (ZAS) ternary system has a relatively high liquidus temperature of about 1750° C.

Titania is a high refractive index oxide with a melting point of 1840° C., and is typically used because of its optical and electrical properties, but not generally for hardness or strength. Similar to zirconia, titania is a strong nucleating agent known to cause crystallization of glass compositions. Despite its high individual melting point, as a fourth component added to the ZAS system, titania further lowers the liquidus temperature, while significantly raising the refractive index of ZAS compositions. Remarkably, the mechanical properties of lower melting titania containing beads are excellent or even significantly improved, even for compositions in which the alumina content is low (for example, about 20%) and for which the combined amount of alumina plus zirconia is low (for example, about 40%). Further, quaternary compositions containing titania are readily quenched to glasses and controllably crystallized to glass ceramics, even when the zirconia content is high (for example, greater than about 40%), and even when the combined zirconia plus titania content is greater than 50%. Hence, compositions of the present invention containing titania plus one or more of alumina, zirconia, and silica provide relatively low liquidus temperatures, high refractive indices, high crystallinity, excellent mechanical properties, and high transparency.

In the compositions of the present invention, the combined amount of titania, zirconia, and alumina is greater than the amount of silica. Titania, zirconia, and alumina provide crystalline phases or high hardness that improve mechanical properties. Compositions that contain too much silica tend to have undesirably low refractive indices. The ratio of the total weight of alumina plus zirconia plus titania to the weight of silica, namely (alumina+zirconia+titania)/silica, is preferably at least about 1.2, and more preferably, at least about 2. More preferably, the ratio is within a range of about 3 to about 7. If this ratio of alumina plus zirconia plus titania to silica is too small, the effect of increasing bead hardness will decrease. Conversely, if this ratio is too large, there is the risk of impairing bead transparency.

The alumina content is preferably no greater than about 70%, and the zirconia content is preferably no greater than about 50%, based on the total weight of the solid microspheres. Preferably, the total content of alumina and zirconia is at least about 5% by weight, more preferably, at least about 10% by weight, even more preferably, at least about 20% by weight, even more preferably, at least about 25% by weight, and most preferably, at least about 40% by weight, based on the total weight of the solid microspheres.

Preferably, the titania content of transparent beads according to the present invention is at least about 10% by weight, based on the total weight of the solid microspheres. For certain preferred embodiments, particularly glass beads with good mechanical properties, the titania content is no greater than about 50% by weight. For other embodiments, particularly high refractive index glass ceramic beads, the titania content can be greater than about 50% by weight. Although such glass ceramic beads may have poorer mechanical properties, they typically have an index of refraction of greater than about 2.0 and are useful for wet reflection. More preferably, the titania content is about 15% to about 40% by weight, and most preferably, about 15% to about 35% by weight, based on the total weight of the solid microspheres. As stated above, titania lowers the liquidus temperature and increases the refractive index versus ZAS compositions. Titania also provides compositions with greater crystallinity, without destroying the ability to form a glass during quenching, and to maintain transparency during crystallization.

While ZAS compositions tend to contain primarily zirconia as a crystalline phase, compositions of the present invention typically comprise one or more of zirconia, zirconium titanate, other zirconates, rutile, other titanias and titanates, and other phases following crystallization. Titanium is a variable valence transition metal that forms oxides of varying oxygen content depending on conditions. Titania tends to lose oxygen and becomes a black semiconducting material when exposed to high temperatures and quenched. Compositions of the invention are typically dark, blue, or black as quenched, but can be reoxidized and rendered colorless by heat treatment. The compositions exhibit controlled crystallization characteristics such that they remain transparent following such heat treatments. Accordingly, such heat treatments can be performed that simultaneously remove color and develop desired microcrystallinity within the beads. Generally, compositions containing greater than 50% titania can require a higher heat treatment temperature than those compositions containing less titania to remove color and can tend to crystallize and develop translucency or opacity. Hence, compositions high in titania generally contain calcia or other additives which improve the ability to reoxidize the beads.

Preferably, the silica content of transparent fused beads according to the present invention is less than the total content of alumina plus zirconia plus titania. Typically, if silica is present, it is present in an amount of no greater than about 40% by weight, based on the total weight of the solid microspheres. More preferably, the silica content is within a range of about 5% to about 35% by weight. If the silica content is less than 5% by weight, there is a risk of the transparency of the beads being detrimentally affected and the liquidus temperature being too high. Conversely, if the silica content exceeds 35% by weight, there is a risk of the mechanical properties being detrimentally affected or the refractive index being too low. Most preferably, the silica content is within a range of about 10% to about 30% by weight, based on the total weight of the solid microspheres.

Alkaline earth modifiers are particularly useful for glass formation during quenching, widening the process window for removing color while maintaining transparency, and lowering the liquidus temperature. Surprisingly, the ability to quench to a clear glass is improved, even though the tendency to crystallize on annealing is increased. The temperature at which dark coloration from titania is removed is significantly lowered by alkaline earth additions. Magnesia and other alkaline earths also can result in improved crush strength, possibly by controlling crystallization during the heat treatment step and influencing the resulting microstructure. Too much alkaline earth oxide can result in poorer mechanical strength or poor chemical resistance to acidic environments. Accordingly, the beads contain no greater than about 25% by weight alkaline earth oxides, based on the total weight of the solid microspheres.

Colorants can also be included in the beads of the present invention. Such colorants include, for example, $CeO_2$, $Fe_2O_3$, $CoO$, $Cr_2O_3$, $NiO$, $CuO$, $MnO_2$, and the like. Typically, the beads of the present invention include no more than about 5% by weight, preferably no more than about 1% by weight, colorant, based on the total weight of the beads (theoretical oxide basis). Also, rare earth elements, such as europium, can be included for fluorescence.

Preparation of Microspheres

Microspheres according to the invention can be prepared by conventional processes as, for example, disclosed in U.S. Pat.No.3,493,403 (Tung et al). In one useful process, the starting materials are measured out in particulate form, each starting material being preferably about 0.01 $\mu$m to about 50 $\mu$m in size, and intimately mixed together. The starting raw materials include compounds that form oxides upon melting or heat treatment. These can include oxides (e.g., silica, alumina, zirconia, titania), hydroxides, acid chlorides, chlorides, nitrates, acetates, sulfates, and the like, which can be used either alone or in combination of two or more types. Moreover, compound oxides such as mullite ($3Al_2O_3.2SiO_2$) and zircon ($ZrO_2.SiO_2$) can also be used either alone or in combination with the above-mentioned raw materials.

They are then melted in a gas-fired or electrical furnace until all the starting materials are in liquid form. The liquid batch can be poured into a jet of high-velocity air. Beads of the desired size are formed directly in the resulting stream. The velocity of the air is adjusted in this method to cause a proportion of the beads formed to have the desired dimensions. Typically, such compositions have a sufficiently low viscosity and high surface tension.

Melting of the starting materials is typically performed by heating at a temperature within a range of about 1500° C. to about 1900° C., and often at a temperature of, for example, about 1700° C. A direct heating method using a hydrogen-oxygen burner or acetylene-oxygen burner, or an oven heating method using an arc image oven, solar oven, graphite oven or zirconia oven, can be used to melt the starting materials.

Alternatively, the liquid is quenched in water, dried, and crushed to form particles of a size desired for the final beads. The crushed particles can be screened to assure that they are in the proper range of sizes. The crushed particles can then be passed through a flame having a temperature sufficient to remelt and spheroidize the particles.

In a preferred method, the starting materials are first formed into larger feed particles. The feed particles are fed directly into a burner, such as a hydrogen-oxygen burner or an acetylene-oxygen burner or a methane-air bumer, and then quenched in water (e.g., in the form of a water curtain or water bath). Feed particles may be formed by melting and grinding, agglomerating, or sintering the starting materials. Agglomerated particles of up to about 500 $\mu$m in size (the length of the largest dimension) can be used. The agglomerated particles can be made by a variety of well known methods, such as by mixing with water, spray drying, pelletizing, and the like. The starting material, particularly if in the form of agglomerates, can be classified for better control of the particle size of the resultant beads. Whether agglomerated or not, the starting material may be fed into the burner with the burner flame in a horizontal position. Typically, the feed particles are fed into the flame at its base. This horizontal position is desired because it can produce very high yields (e.g., 100%) of spherical particles of the desired level of transparency.

The procedure for cooling the molten droplets can involve air cooling or rapid cooling. Rapid cooling is performed by, for example, dropping the molten droplets of starting material into a cooling medium such as water or cooling oil. In addition, a method can also be used in which the molten droplets are sprayed into a gas such as air or argon. The resultant quenched fused beads are typically sufficiently transparent for use as lens elements in retroreflective articles. For certain embodiments, they are also sufficiently hard, strong, and tough for direct use in retroreflective articles. Typically, however, a subsequent heat treating step is desired to improve their mechanical properties.

In a preferred embodiment, a bead precursor can be formed and subsequently heated. As used herein, a "bead precursor" refers to the material formed into the shape of a bead by melting and cooling a bead starting composition. This bead precut sor is also referred to herein as a quenched fused bead, and may be suitable for use without further processing if the mechanical properties and transparency are of desirable levels. The bead precursor is formed by melting a starting composition containing prescribed amounts of raw materials (e.g., titanium raw material, silicon raw material, aluminum raw material, and zirconium raw material), forming molten droplets of a predetermined particle size, and cooling those molten droplets. The starting composition is prepared so that the resulting bead precursor contains the desired raw materials in a predetermined ratio. The particle size of the molten droplets is normally within the range of about 10 microns ($\mu$m) to about 2,000 $\mu$m. The particle size of the bead precursors as well as the particle size of the final transparent fused beads can be controlled with the particle size of the molten droplets.

Thus, in certain preferred embodiments, a bead precursor (i.e., quenched fused bead) is subsequently heated. Preferably, this heating step is carried out at a temperature below the melting point of the bead precursor. Typically, this temperature is at least about 750° C. Preferably, it is about 850° C. to about 1100° C., provided it does not exceed the melting point of the bead precursor. If the heating temperature of the bead precursor is too low, the effect of increasing the mechanical properties of the resulting beads will be insufficient. Conversely, if the heating temperature is too high, there is the risk of transparency decreasing. Although there are no particular limitations on the time of this heating step to improve mechanical properties, normally heating for at least about 1 minute is sufficient, and heating should preferably be performed for about 5 minutes to about 100 minutes. In addition, preheating (e.g., for about 1 hour) at a temperature within the range of about 600° C. to about 800° C. before heat treatment is advantageous because it can further increase the transparency and mechanical properties of the beads.

This method is also suitable for growing fine crystal phases in a uniformly dispersed state within a phase that contains, for example, alumina and silica as its main components. A crystal phase containing oxides of zirconium, titanium, etc., can also form in compositions containing high levels of zirconia or titania upon forming the beads from the melt (i.e., without subsequent heating). Significantly, the crystal phases are more readily formed (either directly from the melt or upon subsequent heat treatment) by including an alkaline earth metal oxide (e.g., calcium oxide or a substance such as calcium carbonate that forms calcium oxide following melting or heat treatment) in the starting composition.

Applications

Transparent (preferably, fused) beads according to the present invention can be incorporated into coating compositions (see, e.g., U.S. Pat. No. 3,410,185 (Harrington); U.S. Pat. No. 2,963,378 (Palmquist et al.); and U.S. Pat. No. 3,228,897 (Nellessen)), which generally include a film-forming binding material in which the beads are dispersed. Alternatively, the beads can be used in drop-on applications for painted lines as in pavement markings.

Beads of the present invention are particularly useful in pavement-marking sheet material (tapes) as described in U.S. Pat. No. 4,248,932 (Tung et al.), and other retroreflective assemblies, such as those disclosed in U.S. Pat. Nos. 5,268,789 (Bradshaw), 5,310,278 (Kaczmarczik et al.), 5,286,682 (Jacobs et al.), and 5,227,221 (Hedblom). They can be used in exposed lens, encapsulated lens, or embedded lens sheeting.

As taught, for example, in U.S. Pat. No. 2,354,018 (Heltzer et al.) or U.S. Pat. No. 3,915,771 (Gatzke et al.) sheeting useful for pavement markings generally includes a backing, a layer of binder material, and a layer of beads partially embedded in the layer of binder material. The backing, which is typically of a thickness of less than about 3 mm, can be made from various materials, e.g., polymeric films, metal foils, and fiber-based sheets. Suitable polymeric materials include acrylonitrile-butadiene polymers, millable polyurethanes, and neoprene rubber. The backing can also include particulate fillers or skid resistant particles. The binder material can include various materials, e.g., vinyl polymers, polyurethanes, epoxides, and polyesters, optionally with colorants such as inorganic pigments. The pavement marking sheeting can also include an adhesive, e.g., a pressure sensitive adhesive, a contact adhesive, or a hot melt adhesive, on the bottom of the backing sheet.

Pavement marking sheetings can be made by a variety of known processes. A representative example of such a process includes coating onto a backing sheet a mixture of resin, pigment, and solvent, dropping beads according to the present invention onto the wet surface of the backing, and curing the construction. A layer of adhesive can then be coated onto the bottom of the backing sheet.

EXAMPLES

The following provides an explanation of the present invention with reference to its examples and comparative examples. Furthermore, it should be understood that the present invention is no way limited to these examples. All percentages are in weight percents, based on the total weight of the compositions, unless otherwise specified.

Examples 1–16

Several bead compositions of titania, zirconia, alumina, and silica (TZAS or ZAST) were made as indicated. Powders were placed in a glass jar and mixed by shaking. They were then milled in a Szegvari attritor mill (Union Process, Akron, Ohio) as an aqueous slurry at approximately 65–70% solids by weight. 715 grams (g) of 3/16 inch (0.48 cm) diameter spherical alumina media was used to mill a 200 g batch of powders. The volume of the attritor mill was 750 ml. After milling 2 hours at 50% power, the slurry was collected in a jar and placed in a drying oven to evaporate the water. The dried solid was then crushed using a mortar and pestle and screen sieved into the desired particle size range. The powders used were as follows:

| Calcium Carbonate | Alumina (calcined) | Silica |
|---|---|---|
| $CaCO_3$ | $Al_2O_3$ | $SiO_2$ |
| EM Science | Alcoa | US Silica, Sil-Co-Sil #90 |
| Gibbstown, NJ | Nashville, TN | Ottawa, IL |
| FW 100 | FW 102 | FW 60 |

-continued

| Titania | Magnesium Carbonate | Zirconium (IV) Oxide |
|---|---|---|
| $TiO_2$ | $(MgCO_3)_4$—$Mg(OH)_2$—$5H_2O$ | $ZrO_2$ |
| Sigma Chemical | Matheson, Coleman and Bell | Aldrich |
| St Louis, MO | Norwood, OH | Milwaukee, WI |
| FW 80 | FW 486 | FW 123 |

The apparatus used to flame-form the beads consisted of a stainless steel metal enclosure with water flowing down a slanted plane, into a trough, and then to the drain. A hydrogen torch was aimed into the enclosure and at the slanted plane. The hydrogen torch used for bead processing was a Bethlehem bench burner that is typically used for working on glassware. The gases were surface mixed as opposed to premixed. The burner has a small inner ring and large outer ring, each of which have both fuel and oxygen. The torch is recommended for most fuels, with the exception of acetylene. In the process used herein both the inner and outer ring were used, with the following gas flows in standard liters per minute (SLPM):

|  | hydrogen | oxygen |
|---|---|---|
| inner ring | 8.0 | 3.0 |
| outer ring | 23.0 | 9.8 |
| total | 31.0 | 12.8 |

The dried and sized particles were fed directly into the hydrogen torch flame using a feeder apparatus which consisted of a screen sieve and funnel. Both were tapped by a mechanical apparatus at a chosen frequency to give a desired feed rate. The particles fell into the flame about 1–2 inches (2.5–5.0 cm) in front of the burner face and were carried by the flame to the water, which quenched and collected the beads in a trough. The material was collected and dried. The material was then reprocessed in the torch using a gravity-fed 'necked-down' funnel similar to a small hour glass which gave a very uniform and narrow particle feed into the flame.

The flame-formed beads were then heat treated to develop microcrystallinity. Typically, 1 g of material was placed in a small alumina crucible and heat treated according to the following conditions: ramp 20° C./minute to desired hold temperature; hold 1 hour at temperature; and cool to room temperature at closed-door furnace cooling rate averaging about 10° C./minute. Heat treatment temperatures of 900° C., 950° C., 1000° C., 1050° C., and 1100° C., for each composition were used. The heat treatments were done in a Ney Dental International furnace, model Vulcan 3–550 (Cole-Parmer, Niles, Ill.).

Microspheres of several compositions were fabricated and tested. The results are reported in Tables 1 and 2. Melting behavior was tested by placing small mixtures of each composition on platinum foil, heating in a furnace, and observing the samples with an optical microscope. Entries in Table 2 under the heading "14, 15, and 16" indicated observations after heating to 1400° C., 1500° C., and 1600° C., with "1" indicating no melting and "5" indicating complete melting. Temperatures required to re-oxidize the bead, and the maximum temperature below which opacification occurred are indicated under "color and haze." Crush strengths following heat treatments (determined according to the test procedure described in U.S. Pat. No. 4,772,511 (Wood)) are also indicated.

TABLE 1

| | Composition | | | | | Melting | | | Quench- | Color and haze | Strength (MPa) | | |
|---|---|---|---|---|---|---|---|---|---|---|---|---|---|
| Ex | T | Z | A | S | AE | 14 | 15 | 16 | ing glass | (temps: oxid/haze) | as made | best B | other |
| 1 | 36 | 7 | 34 | 23 | x | 1 | 4 | 5 | yes | 1050° C./1075° C. | | 1600 | |
| 2 | 31 | 24 | 20 | 25 | x | 1 | 5 | 5 | partial | 1050° C./1000° C. | | | |
| 3 | 30 | 28 | 28 | 22 | 5 | 1 | 4 | 5 | yes | 1050° C./1050° C. | | 1187 | 2236 |
| 4 | 27 | 32 | 15 | 26 | x | 1 | 5 | 5 | no | 1100° C./all opaque | | | |
| 5 | 5 | 13 | 50 | 12 | x | 1 | 1 | 3 | yes | 1100° C./1100° C. | 1256 | | |
| 6 | 21 | 28 | 35 | 16 | 4 | 1 | 1 | 4 | yes | 925° C./1125° C. | 945 | 1021 | 1221 |
| 7 | 12 | 39 | 37 | 12 | x | 1 | 1 | 3 | yes | <900° C./>1100° C. | | 1042 | 1663 |
| 8 | 12 | 34 | 44 | 10 | 5 | 1 | 1 | 4 | yes | 900° C./1075° C. | 1028 | 1042 | 1994 |

"T" = titania ($TiO_2$)
"Z" = zirconia ($ZrO_2$)
"A" = alumina ($Al_2O_3$)
"S" = silica ($SiO_2$)
"AE" = alkaline earth (MgO + CaO)
"Best B" indicates the highest heat treatment temperature for which no visible haze had occurred.
"Other" is a higher temperature which resulted in some haze.
"As made" indicates quenched beads prior to heat treatment.

TABLE 2

Effect of alkaline earth additions

| | Composition | | | | | Melting | | | Quench- | Color and haze | Strength (MPa) | | |
|---|---|---|---|---|---|---|---|---|---|---|---|---|---|
| Ex | T | Z | A | S | AE | 14 | 15 | 16 | ing glass | (temps: oxid/haze) | as made | best B | other |
| 2 | 31 | 24 | 20 | 25 | x | 1 | 5 | 5 | partial | 1050° C./1000° C. | | | |
| 9 | 31 | 24 | 20 | 25 | 5 | | | | yes | 1050° C./1000° C. | | | |
| 10 | 31 | 24 | 20 | 25 | 10 | | | | yes | 900° C./1000° C. | | 1132 | |
| 11 | 31 | 24 | 20 | 25 | 15 | 4 | 5 | 5 | yes | 900° C./950° C. | | 745 | |
| 4 | 27 | 32 | 15 | 26 | x | 1 | 5 | 5 | no | 1100° C./all opaque | | | |
| 12 | 27 | 32 | 15 | 26 | 5 | | | | yes | 1000° C./1000° C. | | 1297 | |
| 13 | 27 | 32 | 15 | 26 | 10 | | | | yes | 925° C./950° C. | | 580 | |
| 5 | 25 | 13 | 50 | 12 | x | 1 | 1 | 3 | yes | 1100° C./1100° C. | | 1256 | |
| 14 | 25 | 13 | 50 | 12 | 5 | | | | yes | 1025° C./1050° C. | | | |
| 15 | 25 | 13 | 50 | 12 | 10 | | | | yes | 975° C./1025° C. | | 1173 | |
| 16 | 28 | 13 | 42 | 17 | 18 | 5 | 5 | 5 | yes | 900° C./950° C. | | 1228 | |

Example 17

Silica powder (Kinseimatech Co., Snow Mark sp-3, 1.05 g), zirconium oxide powder (Daiichikigenso Ind. Co., EP, 8.25 g), aluminum oxide powder (Sumitomo Chem. Co., AES-12, 6.75 g), calcium carbonate powder (Ube Materials, 3N-A, 3.3 g), and titania powder (Ishihara Techno Co., CR-EL, 16 g) were mixed with 50 g of water. The mixture was placed in a glass jar and tumbled for 20 hours at which point it was dried and crushed with a mortar. The crushed powder was subsequently reagglomerated by tumbling again in a glass jar. The agglomerates were sieved to between 106 and 180 microns. This agglomerated material was heated to 1100° C. and allowed to remain at this temperature for 1 hour.

The powder obtained was dropped into a $H_2-O_2$ flame to melt and was quenched in water. The flame was generated with a hydrogen/oxygen ratio of 5, with a length of 35 centimeters. The angle was 0–20 degrees, i.e., essentially horizontal. The diameter of the burner outlet was 40 millimeters.

Glass beads formed were heat-treated at 950° C. for 5 minutes after drying. The refractive index of the glass beads was 2.17 and the Vickers hardness was 1153 kg/mm². The Vickers hardness of a common soda lime glass was found to be 515 kg/mm².

Vickers hardness is produced by means of penetrating a diamond pyramid under a given load into a material and subsequently measuring the indentation made optically. The base of a Vickers pyramid is square with the apical angle between the opposite pyramid faces always being 136 degrees. The depth of the indentation corresponds to 1/7 of the indentation diagonal and the hardness equals to 0.00189* $F/d^2$ where F is the force applied in Newtons and d is the length in microns of the indentation diagonal. In the examples Hv 100 means the Vickers hardness when a 100 g load is applied.

Examples 18–23

Glass beads were prepared by following Example 17. In this example, the compositions of the starting materials were as listed in Tables 3 and 4. Vicker's hardness of resultant beads (heat treated at 950° C. for 5 minutes) is also shown in Table 3.

TABLE 3

| Ex. | $SiO_2$ (g) | $ZrO_2$ (g) | $Al_2O_3$ (g) | $TiO_2$ (g) | $CaCO_3$ (g) | Refractive Index | Hv100 (kg/mm²) |
|---|---|---|---|---|---|---|---|
| 18 | 0.5 | 5.5 | 4.5 | 17 | 14 | 2.17 | 991 |
| 19 | 1.13 | 5.5 | 4.5 | 14 | 7 | 2.16 | 991 |
| 12 | 1.13 | 8.25 | 6.75 | 14 | 7 | 2.12 | 982 |
| 21 | 0.66 | 5.5 | 4.5 | 12 | 9 | 2.13 | 1038 |
| 22 | 3 | 5.5 | 4.5 | 15.2 | 5.6 | 2.11 | 1001 |
| 23 | 1 | 2.75 | 2.25 | 11.2 | 3.7 | 2.22 | 1031 |

TABLE 4

| Ex. | SiO$_2$ (wt. %) | ZrO$_2$ (wt. %) | Al$_2$O$_3$ (wt. %) | TiO$_2$ (wt. %) | CaCO$_3$ (wt. %) | Total |
|---|---|---|---|---|---|---|
| 18 | 1.20 | 13.25 | 10.84 | 40.96 | 33.73 | 100.00 |
| 19 | 3.52 | 17.12 | 14.01 | 43.57 | 21.79 | 100.00 |
| 20 | 3.04 | 22.22 | 18.18 | 37.71 | 18.85 | 100.00 |
| 21 | 2.08 | 17.37 | 14.21 | 37.90 | 28.43 | 100.00 |
| 22 | 8.88 | 16.27 | 13.31 | 44.97 | 16.57 | 100.00 |
| 23 | 4.78 | 13.16 | 10.77 | 53.59 | 17.70 | 100.00 |

Examples 24–25

Gass beads were prepared by following Example 17. In this example, the compositions of the starting materials were as listed in Tables 5 and 6. Vicker's hardness of resultant beads (heat treated at 950° C. for 5 minutes) also shown in Table 5.

TABLE 5

| Ex. | SiO$_2$ (g) | ZrO$_2$ (g) | Al$_2$O$_3$ (g) | TiO$_2$ (g) | CaCO$_3$ (g) | Refractive Index | Hv100 (kg/mm$^2$) |
|---|---|---|---|---|---|---|---|
| 8 | 0.5 | 5.5 | 4.5 | 19 | 14 | 2.2 | 1037 |
| 9 | 0.5 | 5.5 | 4.5 | 21 | 14 | 2.22 | 1097 |

TABLE 6

| Ex. | SiO$_2$ (wt. %) | ZrO$_2$ (wt. %) | Al$_2$O$_3$ (wt. %) | TiO$_2$ (wt. %) | CaCO$_3$ (wt. %) | Total |
|---|---|---|---|---|---|---|
| 24 | 1.15 | 12.64 | 10.34 | 43.68 | 32.18 | 100.00 |
| 25 | 0.58 | 6.40 | 52.33 | 24.42 | 16.28 | 100.00 |

The complete disclosures of all patents, patent documents, and publications are incorporated herein by reference as if individually incorporated. It will be appreciated by those skilled in the art that various modifications can be made to the above described embodiments of the invention without departing from the essential nature thereof The invention is intended to encompass all such modifications within the scope of the appended claims.

What is claimed is:

1. Transparent solid microspheres comprising: titania and at least one of alumina, zirconia, and silica, wherein the total content of the titania plus alumina, zirconia and/or silica is at least about 75% by weight, the total content of titania, alumina, and zirconia is greater than the content of silica, and the titania content is about 10% by weight to about 50% by weight, based on the total weight of the microspheres.

2. The transparent microspheres of claim 1, comprising an alkaline earth oxide in an amount of no greater than about 25% by weight, based on the total weight of solid microspheres.

3. The transparent microspheres of claim 1, wherein the total content of zirconia plus alumina is at least about 10% by weight, based on the total weight of the solid microspheres.

4. The transparent microspheres of claim 2, wherein the total content of zirconia plus alumina is at least about 25% by weight, based on the total weight of the solid microspheres.

5. The transparent microspheres of claim 1, wherein the total content of zirconia plus alumina is at least about 40% by weight, based on the total weight of the solid microspheres.

6. The transparent microspheres of claim 1, wherein the total content of zirconia plus alumina is at least about 5% by weight and the titania content is about 15% by weight to about 40% by weight, based on the total weight of the solid microspheres.

7. The transparent microspheres of claim 1, wherein the index of refraction is at least about 1.7.

8. The transparent microspheres of claim 1, wherein the index of refraction is at least about 1.8.

9. The transparent microspheres of claim 1, wherein the index of refraction is at least about 1.85 and no greater than about 2.

10. The transparent microspheres of claim 1, wherein the microspheres comprise a microcrystalline glass-ceramic structure.

11. The transparent microspheres of claim 10, comprising: a crystalline phase comprising a titanate, a titania, a zirconate, a zirconia, or combinations thereof.

12. The transparent microspheres of claim 1, prepared from a composition having a liquidus temperature of no greater than about 1400° C.

13. The transparent microspheres of claim 1, prepared from a composition having a liquidus temperature of no greater than about 1300° C.

14. The transparent microspheres of claim 1, comprising no greater than about 10% by weight alkaline earth oxide selected from the group of BaO, SrO, and mixtures thereof.

15. The transparent microspheres of claim 1, having a crush strength of at least about 690 MPa.

16. The transparent microspheres of claim 1, having a crush strength of at least about 960 MPa.

17. The transparent microspheres of claim 1, wherein the microspheres are fused.

18. Transparent, solid microspheres comprising a microcrystalline glass-ceramic structure, said microspheres comprising: titania and at least one of alumina, zirconia, and silica, wherein the total content of the titania plus alumina, zirconia and/or silica is at least about 75% by weight, the total content of titania, alumina, and zirconia is greater than the content of silica, and the titania content is present is an amount of at least about 10% by weight, based on the total weight of the solid microspheres.

19. The transparent glass ceramic microspheres of claim 18, wherein the total content of zirconia plus alumina is at least about 10% by weight, based on the total weight of the solid microspheres.

20. The transparent glass ceramic microspheres of claim 18, wherein the index of refraction is at least about 1.8.

21. The transparent glass ceramic microspheres of claim 18, wherein the index of refraction is at least about 2.0.

22. The transparent glass ceramic microspheres of claim 18, wherein the Vickers hardness is at least about 800 kg/mm$^2$.

23. The transparent solid microspheres of claim 18, comprising at least one crystalline compound comprising a titanate compound, titania, a zirconate compound, zirconia, or combinations thereof.

24. The transparent glass ceramic microspheres of claim 23, wherein the crystalline compound is titanium oxide.

25. The transparent glass ceramic microspheres of claim 23, wherein the crystalline compound is zirconium oxide.

26. Transparent, solid, fused microspheres comprising a microcrystalline glass-ceramic structure, said microspheres comprising: titania and at least one of alumina, zirconia, and silica, wherein the total content of the titania plus alumina, zirconia and/or silica is at least about 75% by weight, the total content of titania, alumina, and zirconia is greater than the content of silica, and the titania content is present is an amount of at least about 10% by weight, based on the total weight of the solid microspheres.

27. The transparent glass ceramic microspheres of claim 26, wherein the titania content is about 10% by weight to about 50% by weight, based on the total weight of the solid microspheres.

28. A retroreflective article, comprising: transparent microspheres according to claim 1.

29. A retroreflective article, comprising: transparent microspheres according to claim 18.

30. A retroreflective article, comprising: transparent microspheres according to claim 26.

31. A pavement marking, comprising: transparent microspheres according to claim 1.

32. A pavement marking, comprising: transparent microspheres according to claim 18.

33. A pavement marking, comprising: transparent microspheres according to claim 26.

* * * * *

UNITED STATES PATENT AND TRADEMARK OFFICE
CERTIFICATE OF CORRECTION

PATENT NO. : 6,245,700 B1  Page 1 of 1
DATED : June 12, 2000
INVENTOR(S) : Kenton D. Budd et al.

It is certified that error appears in the above-identified patent and that said Letters Patent is hereby corrected as shown below:

Column 8,
Line 8, "precut sor" should read -- precursor --.

Column 13,
Line 41, please insert -- . -- following "thereof".

Column 14,
Line 40, "is" should read -- in --, in the second instance.

Column 15,
Line 1, "is" should read -- in --, in the second instance.

Signed and Sealed this

Twenty-sixth Day of February, 2002

Attest:

JAMES E. ROGAN
Attesting Officer        Director of the United States Patent and Trademark Office